United States Patent [19]
Wenk

[11] Patent Number: 5,625,629
[45] Date of Patent: Apr. 29, 1997

[54] METHOD OF ENSURING BANDWIDTH AVAILABILITY FOR NON-PAGE TRAFFIC IN A COMMUNICATIONS SYSTEMS

[75] Inventor: Richard D. Wenk, San Diego, Calif.

[73] Assignee: Hughes Electronics, Los Angeles, Calif.

[21] Appl. No.: 511,676

[22] Filed: Aug. 7, 1995

[51] Int. Cl.$^6$ .............. H04J 3/12; H04B 7/212; H04Q 7/00

[52] U.S. Cl. ............... 370/347; 340/311.1; 340/825.44; 379/63; 455/38.3; 455/343

[58] Field of Search .................. 370/95.1, 95.3, 370/110.1, 82; 455/33.1, 33.2, 33.4, 38.3, 53.1, 54.1, 54.2, 56.1, 38.1, 68, 70, 88, 343, 38.2; 379/58, 59, 57, 60, 63; 340/311.1, 825.44

[56] References Cited

U.S. PATENT DOCUMENTS

| | | | |
|---|---|---|---|
| 4,754,453 | 6/1988 | Eizenhofer | 370/95.1 |
| 5,081,704 | 1/1992 | Umeda et al. | 370/95.3 |
| 5,199,031 | 3/1993 | Dahlin | 370/110.1 |
| 5,381,443 | 1/1995 | Borth et al. | 370/110.1 |
| 5,404,355 | 4/1995 | Raith | 370/110.1 |
| 5,502,721 | 3/1996 | Pohojakallio | 370/95.3 |
| 5,511,110 | 4/1996 | Drucker | 370/95.1 |

OTHER PUBLICATIONS

Seizo Onoe et al., "Radio Link Control Techniques for Digital Cellular Systems", NTT Review, vol. 4, No. 4, pp. 47–53, Jan. 1992.

Katsumi et al., "TDMA Radio Link Control Techniques and Development of a Digital Cellular System", IEICE Trans. fundamentals, vol. E75–A, No. 12, pp. 1619–1624. Dec. 1992.

*Primary Examiner*—Alpus H. Hsu
*Assistant Examiner*—Seema S. Rao
*Attorney, Agent, or Firm*—John T. Whelan; Wanda Denson-Low

[57] ABSTRACT

A method of ensuring bandwidth availability for non-page point-to-point traffic in a communications system employs the steps of assembling a Superframe within a base station, and transmitting the Superframe from the base station to a radio unit. The Superframe is divided into a plurality of slots. A broadcast control channel is defined as a first portion of the plurality, and a point-to-point control channel is defined as a second portion of the plurality. The broadcast control channel has a Non-PCH Subchannel slot information element specifying a number of Non-PCH Subchannel slots within the point-to-point control channel.

14 Claims, 6 Drawing Sheets

METHOD OF ENSURING BANDWIDTH AVAILABILITY FOR NON-PAGE TRAFFIC IN A COMMUNICATIONS SYSTEMS

BACKGROUND OF THE INVENTION

The present invention relates to ensuring bandwidth availability in a communications system, and more particularly to ensuring such bandwidth availability in a communications system. Even more particularly, the present invention relates to ensuring bandwidth availability in a point-to-point messaging portion of a digital control channel in a communications system.

Interim Standard (IS) 136 (promulgated by the Telecommunications Industry Association) adds a Digital Control Channel (DCCH) to IS-54B, an 800 MHZ TDMA Cellular Standard. The fundamental unit of measure in the digital control channel is a slot. Slots are logically combined (in groups of 16 for a half-rate digital control channel and 32 for a full-rate digital control channel) to form "Superframes". Of the slots in a Superframe available for signaling, some are designated by the base station (BMI) for broadcast (point-to-multipoint) messaging and the rest for point-to-point messaging. In order for the base station to be able to notify (or "page") a mobile station (MS) of an incoming call (or other impending transaction), the mobile station is assigned to one and only one of the slots in a Superframe available for point-to-point messaging on the forward digital control channel (i.e., that portion of the digital control channel used to transmit messages from the base station to the mobile station). Note that the term mobile station is used herein to refer to a radio unit in a communications system, and is not limited to being "mobile." The term "mobile" unit is used herein merely because of its wide (and perhaps unfortunate) acceptance and clear meaning in the communications arts, which includes radio units that are "stationary" or "fixed". When the base station needs to "page" the mobile station, i.e., notify the mobile station that it has an incoming call (or other impending transaction), the base station transmits a "page message" or a "hard page" in the assigned slot. (An advantageous approach to utilizing "hard pages" is described in U.S. patent pending application Ser. No. 08/394,091, entitled OPTIMAL PAGING OF ONE OR TWO MOBILE STATIONS USING A HARD PAGE SLOT, commonly invented and assigned with the present patent document, incorporated herein by reference.) Under quiescent conditions, the mobile station need only monitor this assigned slot in the Superframe. Thus, the mobile station is able to "sleep" while the other 31 slots of the Superframe are being transmitted. In addition, because every other Superframe transmitted (i.e., every primary Superframe) by the base station is followed by a Superframe (secondary Superframe) having identical point-to-point paging slots, the mobile unit can sleep during every other entire Superframe. For other types of point-to-point traffic, however, the mobile station is not assigned to a specific slot in a Superframe; rather, when it is expecting a "non-page message," i.e., not a message intended to notify the mobile station of an incoming call (or other impending transaction), from the base station, the mobile station is required to search for non-page messages addressed to itself in each slot available for point-to-point messaging within the Superframe.

Currently, mobile stations are hashed to a slot in the Superframe (called a PCH Subchannel) where the mobile station it expects to receive page traffic. Nominally, the mobile station is required to read this same slot in every other Superframe.

For illustration purposes, assume a minimal full-rate digital control channel containing four broadcast control channel (BCCH) slots and no Reserved slots. Hence, there are 28 point-to-point message slots, i.e., point-to-point messaging channel slots available for paging (i.e., available for use as PCH Subchannels.) If only 10% of the UPR maximum paging capacity (i.e., User Performance Requirements maximum paging capacity, which is defined as 373,000 pages/hour, or 14 pages/hyperframe by C.T.I.A.) is assumed, then up to one-half of the available point-to-point messaging channel bandwidth could be dedicated to paging. As either the paging traffic increases or the number of point-to-point messaging slots decrease (due to, e.g., additional BCCH messaging), the ratio of pages to PCH Subchannels can approach or exceed 1:1.

The consequence of an increase in paging traffic or corresponding decrease in point-to-point messaging channel bandwidth is that the number of slots available for other messages (e.g., non-page messages) is reduced, and consecutive slots for multi-slot messages become scarce. (The term multi-slot message, as used herein, refers to a page message or a non-page message that spans more than one point-to-point messaging channel slot.) Thus throughput of multi-slot messages and non-page messages may be decreased as paging traffic increases, causing delay in the transmission of such messages.

As used herein, the terms "page message" and "hard page" refers to one or more slots of data transmitted from a base station over the point-to-point messaging channel that contains information intended to signal one (or possibly more) of a plurality of transceiver units that such transceiver unit(s) have an incoming call. (An incoming call can be, e.g., a voice call or any other type of incoming call capable of being serviced by the base station and transceiver units.) The term "non-page message" refers to any slots of data transmitted over the point-to-point messaging channel that are not "page messages" or "hard pages."

Since IS-136 provides for multi-page PCH frames (meaning that more than one mobile station may be paged in a single PCH Subchannel), the volume of available PCH Subchannels, i.e., point-to-point messaging slots assignable as PCH Subchannels, is not a primary issue. However, to compensate for the decrease in bandwidth available for single and multi-slot non-page point-to-point message traffic, the base station must increasingly rely on a technique known as "PCH Continuation" to open up gaps into which this non-page point-to-point message traffic can be accommodated. In a worst case scenario, pages must be delayed, i.e., displaced into later slots, in order to allow some minimal bandwidth for non-page point-to-point message traffic. Such delay, when it affects pages destined for PCH Subchannels late in the primary Superframe, may result in such pages being delayed into a subsequent primary Superframe.

PCH Continuation (PCON) is the process by which the base station directs a mobile station to continue reading a number of point-to-point messaging slots after it first reads its assigned PCH Subchannel. Whenever a mobile station reads its assigned PCH Subchannel and determines that there is no message addressed to its mobile station identification number (MSID), it reads a PCON bit that is carried in the PCH Subchannel. If the PCON bit is set to 0, for example, the mobile station may sleep until the next occurrence of its assigned PCH Subchannel in the next primary Superframe. On the other hand, when the base station sets PCON equal to 1, i.e., when the base station activates PCH Continuation, the mobile station responds by reading additional point-to-point messaging slots, as determined by a PCH_DISPLACEMENT parameter sent on the BCCH.

When PCH Continuation is activated on a full-rate digital control channel, the mobile station reads every other point-to-point messaging slot after its assigned PCH Subchannel until a number of additional point-to-point messaging slots equal to the PCH_DISPLACEMENT parameter have been read or until it reads a page message addressed to its mobile station identification (MSID) number. When a mobile station has read the last point-to-point messaging slot in the primary Superframe and the number of slots equal to the PCH_DISPLACEMENT parameter still have not yet been read, the mobile station continues reading slots beginning with the second point-to-point messaging channel slot in the next primary Superframe. Similarly, if a mobile station has read the second to last point-to-point slot in a primary Superframe and the number of slots equal to the PCH_DISPLACEMENT parameter still have not been read, the mobile station continues reading slots beginning with the first point-to-point messaging slot in the next primary Superframe.

When PCH Continuation is activated on a half-rate digital control channel, the mobile station operates as it does on a full-rate digital control channel, except that instead of reading every other slot in the point-to-point messaging channel, it reads every point-to-point messaging slot after its assigned PCH Subchannel. The reading of every point-to-point messaging slot continues until the number of slots equal to the PCH_DISPLACEMENT parameter has been read or until the mobile station receives a page message addressed to its mobile station identification (MSID).

Point-to-point message continuation is the process by which the base station sends a message over multiple point-to-point messaging slots. A mobile station responds to point-to-point messaging channel message continuation whenever it determines that a message addressed to its mobile station identification (MSID) number, sent by the base station, occupies more than one point-to-point messaging slot. A page message spanning more than 1 point-to-point messaging slot, when sent on a full-rate digital control channel, is transmitted using every other point-to-point messaging slot. A page message spanning more than 1 point-to-point messaging slot, when sent on a half-rate digital control channel, is transmitted using consecutive point-to-point messaging slots. A non-page message spanning more than 1 point-to-point messaging slot is transmitted using consecutive point-to-point messaging slots unless interrupted.

SUMMARY OF THE INVENTION

The present invention advantageously addresses the needs above as well as other needs by providing a method of ensuring bandwidth availability in a point-to-point messaging portion of a digital control channel in a communications system.

The invention, in one embodiment, may be characterized as a method employing the steps of assembling a Superframe within a base station, and transmitting the Superframe from the base station to a radio unit. The Superframe is divided into a plurality of slots. A broadcast control channel is defined as a first portion of the plurality of slots within the Superframe, and a point-to-point control channel is defined as a second portion of the plurality of slots. In accordance with this embodiment, the broadcast control channel has a Non-PCH Subchannel slot information element, e.g., two bits, that specifies a number, e.g., 0, 2, 4 or 6, of Non-PCH Subchannel slots, i.e., slots designed for Non-PCH Subchannel point-to-point messaging purposes, within the point-to-point control channel.

The Non-PCH Subchannel slots are not available for use as PCH Subchannels (i.e., radio units cannot be hashed to Non-PCH Subchannel slots for purposes of receiving page messages or hard pages), but are available for non-page message traffic, PCH Continuation, point-to-point message continuation and the like. Thus, even in a system operating near or in excess of UPR maximum paging capacity, these Non-PCH Subchannel slots guarantee a minimum bandwidth for non-page messaging.

Furthermore, because these Non-PCH Subchannel slots are, in a preferred embodiment, positioned at the end of the point-to-point messaging portion (or channel) of the primary Superframe, radio units having PCH Subchannels at or near the end of the Superframe that are undergoing PCH Continuation are less likely to be required to "look" into a subsequent primary Superframe to locate the PCH Continued message. As a result, such radio units realize a decreased delay in receiving PCH Continued messages, as well as a power savings (due to the fact that the receive channel and processor can be powered down after the primary Superframe, rather than having to wait to receive the remainder of the PCH Continued message in the subsequent primary Superframe).

A further aspect of the invention, in at least some embodiments, is that a contiguous block of Non-PCH Subchannel slots is provided for multi-slot non-page messages. As a result, the need to use PCH Continuation to create contiguous blocks of slots for multi-slot non-page messages is greatly reduced or eliminated. Thus, efficiency of message transmission is improved and "awake," i.e. active or powered up, time for the receive channel and/or processor of the radio unit can be minimized.

BRIEF DESCRIPTION OF THE DRAWINGS

The above and other aspects and features of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Figure 1:
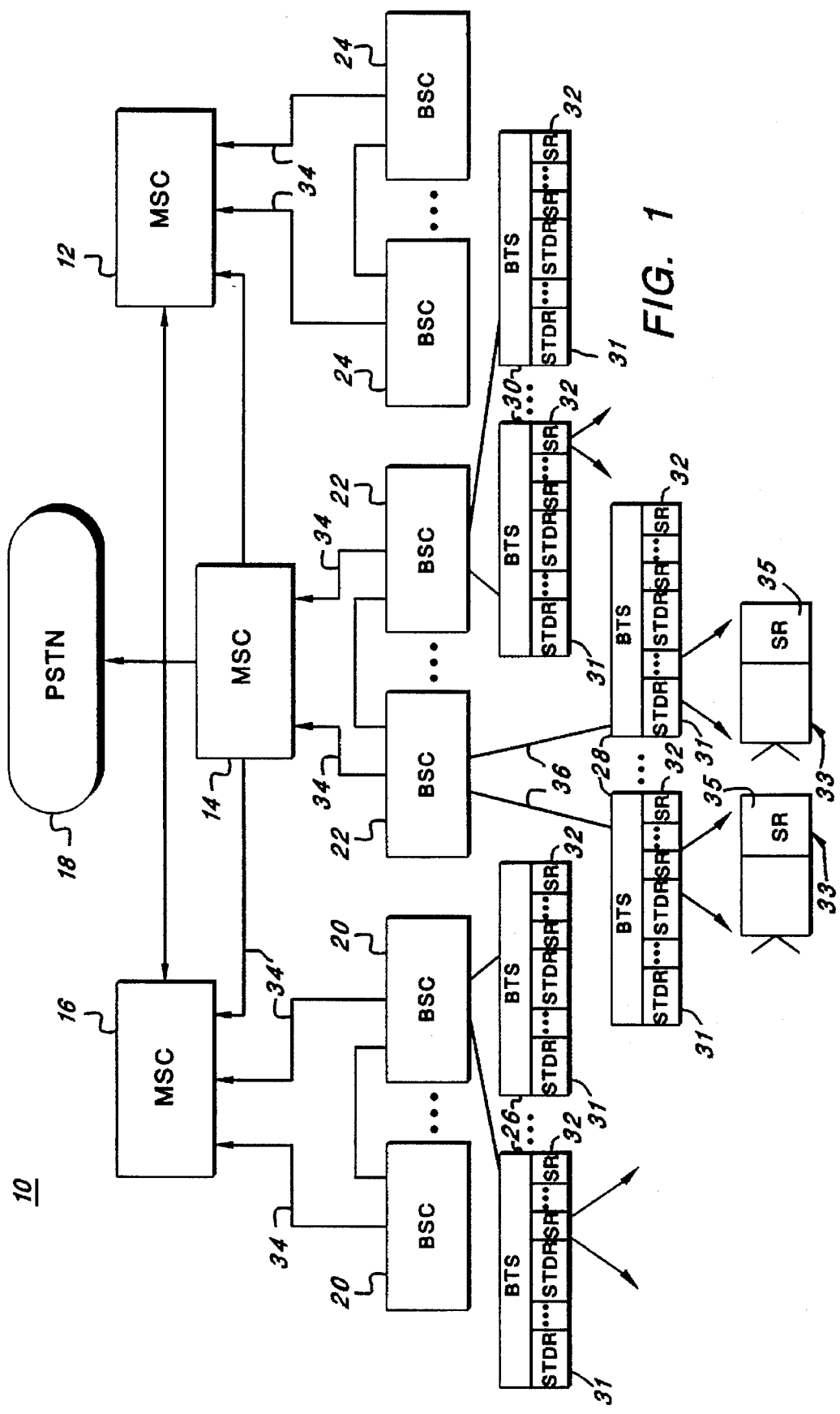
FIG. 1 is a block diagram of a cellular communications system suitable for implementing one embodiment of the present invention.

Referring to FIG. 1, a block diagram is shown of a cellular communications system suitable for implementing one embodiment of the present invention. A cellular telephone system 10 has a plurality of mobile switching centers (MSC) 12, 14, 16, or mobile telephone switching offices (MTSO), that are connected to each other and to a public switched telephone network (PSTN) 18. Each of the mobile switching centers is connected to a respective group of base station controllers (BSC) 20, 22, 24. Each base station controller is connected to a group of individual base transceiver stations (BTS) 26, 28, 30. Each base transceiver station of the groups 26, 28, 30 defines an individual cell of the cellular telephone system.

Each base transceiver station of the groups 26, 28, 30 includes hardware and software functions required to communicate over communications channels of the system 10; and includes transmitters and receivers for communication with mobile telephone units. Each base transceiver station 26, 28, 30 also includes a plurality of individual standard receivers (StdR) 31 and scanning receivers (SR) 32 (for scanning selected portions of the communications channel). Each base transceiver station 26, 28, 30 further includes digital multiplex equipment for transmission of audio traffic to its associated base station controller. It is the base transceiver stations 26, 28, 30, along with their associated base station controllers 20, 22, 24 and mobile switching centers, that perform the steps described herein in order to carry out one embodiment of the invention.

A plurality of digital mobile telephone units 33 are used with the system 10 for communication over the communications channel (or radio frequency traffic channel) with a particular base transceiver station of a particular cell in which the particular base transceiver station is located. Associated with each digital mobile unit 33 is a scanning receiver 35 for scanning selected portions of the communications channel between the mobile unit 33 and the base transceiver station of serving and neighboring cells.

Each base station controller of the groups 20, 22, 24 implements audio compression/decompression, handles call establishment, disconnect, and handoff procedures, and allocates system resources between the individual base transceiver stations 26, 28, 30 associated with each of the base station controllers 20, 22, 24. More specifically, each base station controller performs handoff execution for transferring on-going communications from one cell to another within the group of base transceiver stations connected to the particular base station controller. Each base station controller communicates with its associated mobile switching center for effecting a handoff involving a cell or base transceiver station associated with a different base station controller. Each mobile switching center 12, 14, 16 processes all requests for calls, switching functions, as well as the mobility functions of registration, authentication and handoff.

Figure 2:
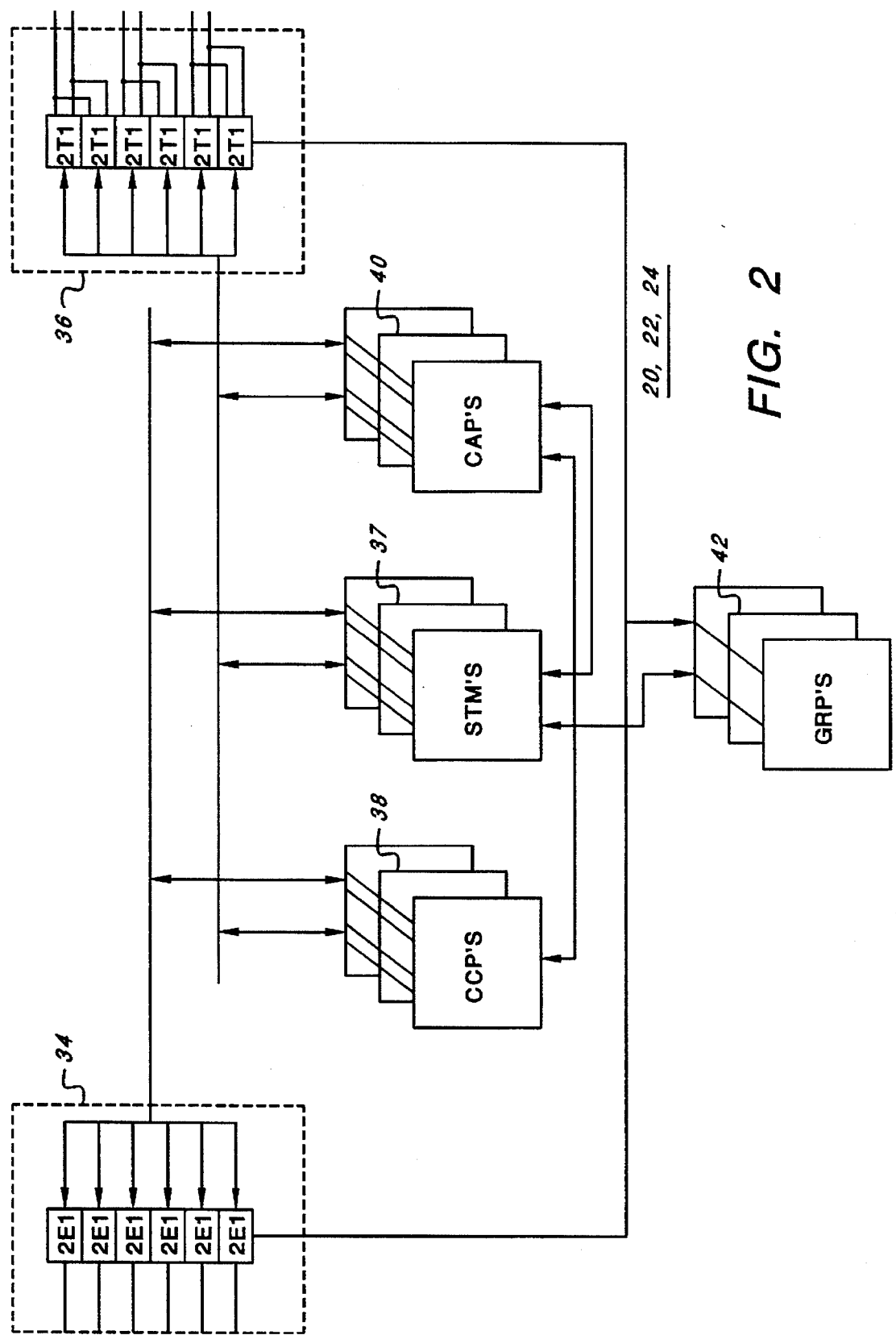
FIG. 2 is a block diagram of a base station controller as shown in FIG. 1.

Referring next to FIG. 2, a detailed block diagram is shown of an exemplary base station controller, representative of the base station controllers 20, 22, 24 in FIG. 1. (As will be understood by one skilled in the art, a similar block diagram representation can be made of the mobile units of the present embodiment). The base station controller 20, 22, 24 includes trunk interfaces 34 to its associated mobile switching center and trunk interfaces 36 to its associated base transceiver stations. In one particular implementation of the present embodiment, each base station controller includes a switching and transcoding module (STM) 37, and is made up of three types of control processors implemented in identical hardware modules 38, 40, 42.

A first of the hardware modules is a call control processor (CCP) 38. In addition to switching of pulse code modulation (PCM) traffic between the trunks 34, 36 for analog traffic, it terminates call protocol for mobile switching. It also performs connection control and mobility management for handoff execution. For digital configurations (in accordance with, e.g., IS-136) there can be more than one call control processor for each base station controller. When there is more than one call control processor per base station controller, calls are distributed among call control processors based upon load. The number of call control processors needed depends upon load and redundancy requirements.

A second of the hardware modules is a channel access processor (CAP) 40, and is required for digital configurations, as described herein. The channel access processor 40 performs voice channel allocations and deallocations. The channel access processor 40 also forwards power and time alignment measurements to the call control processors 38.

A third of the hardware modules is a global resource processor (GRP) 42 that distributes calls among the call control processors 38 based on load; and communicates with other base station controllers for scanning receiver measurements, i.e., the global resource processor 42 communicates with another base station controller to exchange messages relating to scanning receiver (SR) measurements.

Figure 3:
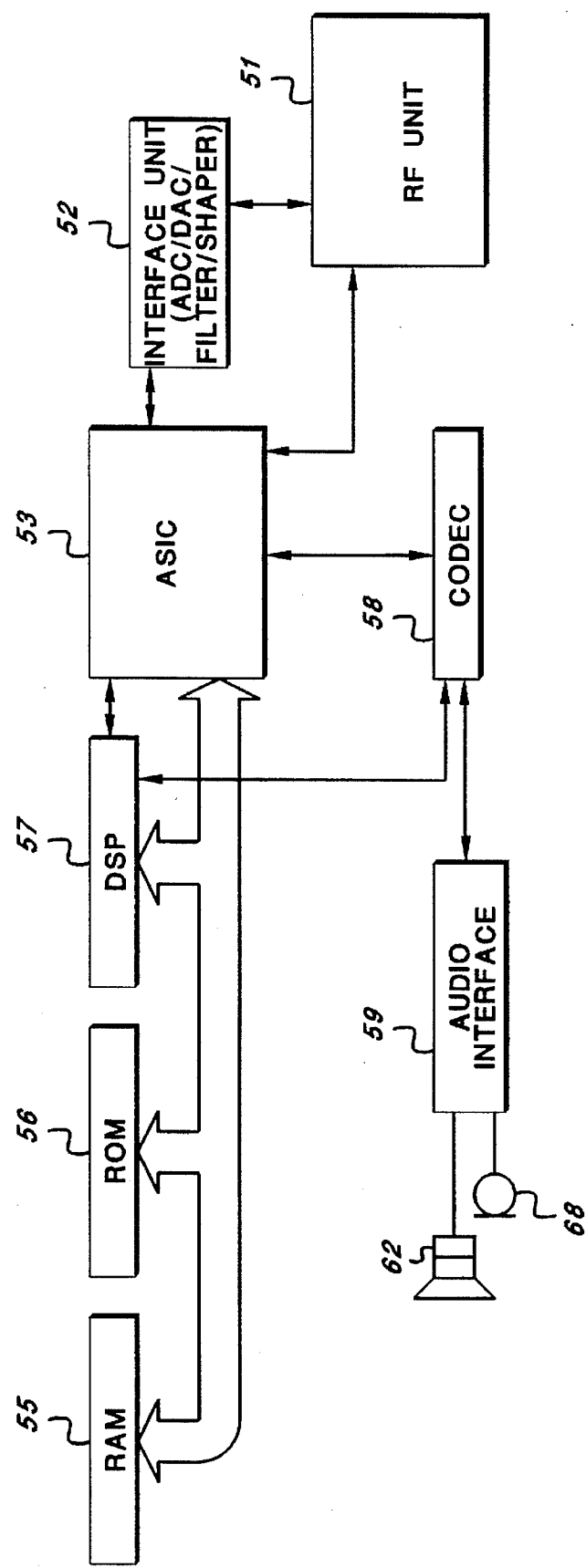
FIG. 3 is a block diagram of a cellular mobile unit with which one embodiment of the present invention can be utilized.

Referring to FIG. 3, a block diagram is shown of an exemplary cellular mobile unit, in which the teachings of the present invention can be utilized. A radio frequency (RF) unit 51 is shown coupled to an interface unit 52, which is in turn coupled to an application specific integrated circuit (ASIC) 53. As is well known in the art, the RF unit includes circuits that comprise a receive channel and circuits that comprise a transmit channel. Such receive channel and transmit channel are well known in the art of cellular telephony. The RF unit 51 can also be directly coupled to the application specific integrated circuit 53. A digital signal processor (DSP) 57 is coupled through a data bus 54 to a random access memory (RAM) 55, a read only memory (ROM) 56, and the application specific integrated circuit 53. The application specific integrated circuit 53 is also coupled to coder-decoders (CODECs) 58, which are coupled through an audio interface 59 to a microphone 68 and a speaker 62.

The RF unit 51 of the cellular mobile unit of FIG. 3 performs conventional radio frequency communications, as are known in the art. The interface unit 52 performs digital to analog conversions, analog to digital conversions, filtering and wave shaping, as dictated by the RF unit 51 and the application specific integrated circuit 53. The application specific integrated circuit 53 is used to implement an FM frequency shift keying (FSK) receiver, an FM message processor, transmit and receive timing generators, interfaces to the CODECs 58, buffering of received samples, fade detection circuitry, FEC encoding and decoding, a fixed point divider unit (for VSELP), a phase lock loop (for generation of a CODEC clock), miscellaneous input/output circuitry, and glue logic for processor interfaces.

The digital signal processor (DSP) 57 is utilized within the cellular transceiver to perform the following functions: π/4 DQPSK modulation/demodulation, VSELP analysis/synthesis, hands-free voice switching, demodulation/equalization, FM audio transmission/reception, FM SAT detection and generation, FM FSK transmission, FM message handling/call processing, digital call processing/control, user interface, monitor/diagnostic/testing, SACCH encoding/decoding/queuing, authentication and key generation, signaling privacy, voice recognition, and voice response. The read only memory (ROM) 56 is used for storage of control software as well as RAM-based overlay code. The read only memory 56 may include an electronically erasable programmable read only memory (EEPROM) (not shown) that can be used for storage of ESN/user information and factory calibration settings. The random access memory (RAM) 56 is used for data storage and program memory overlays. The coder/decoders (CODECs) 58 are used for modulation and wave shaping of transmitted and received signals, as is known in the art. The audio interface 59 includes a linear coder/decoder for voice samples and other interfaces such as filters and multiplexers for interfacing to the microphone 62 and speaker 68.

Figure 4:
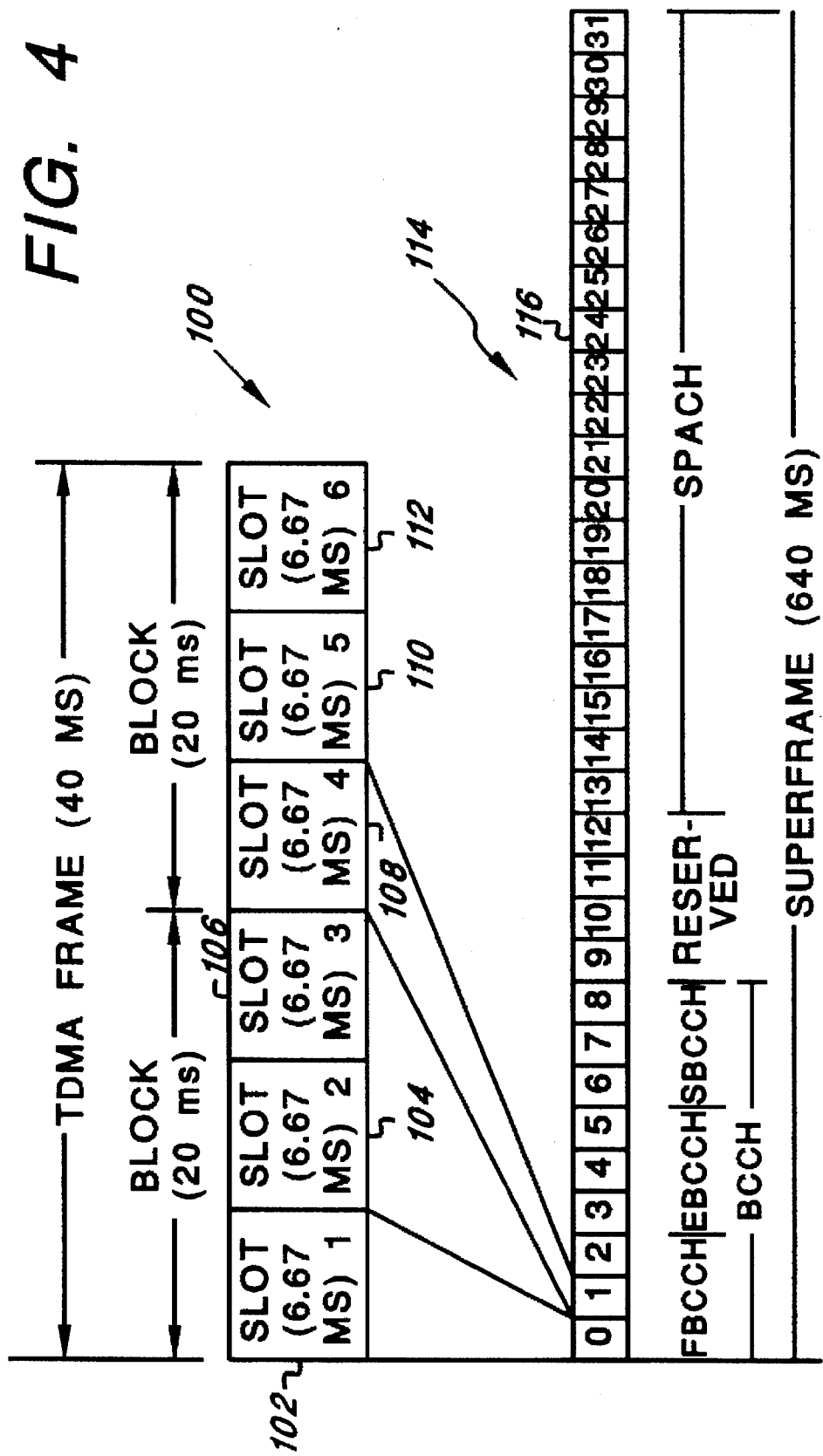
FIG. 4 is a block diagram showing various elements in a time division multiple access digital control channel such as is used by the base station and mobile station of FIGS. 1–3.

Referring next to FIG. 4, a block diagram is shown of the various elements in a time division multiple access digital control channel. A TDMA Frame 100 is depicted made up of six Slots 102, 104, 106, 108, 110, 112. Each Slot 102, 104, 106, 108, 110, 112 is transmitted through the communications channel, consisting primarily of air, during a 6.67 mS period of time, such that the TDMA Frame 100 is 40 mS in duration. In accordance with current TDMA conventions, a TDMA Channel is made up of every third slot within the TDMA Frame. Thus, Slots 1 and 4 (102, 108) are a part of one TDMA channel, Slots 2 and 5 (104, 110) part of another TDMA channel, and Slots 3 and 6 (106, 112) yet another.

Within each TDMA channel, groups of 32 TDMA blocks (and thus 32 slots) comprise a Superframe 114, having a duration of 640 mS. A total of three Superframes, one per TDMA channel, are transmitted every 640 mS. Within each Superframe 114, a portion of the slots are designated the Broadcast Channel (BCCH), another portion Reserved, and another portion point-to-point messaging channel. Each mobile unit monitoring a particular base station is assigned to monitor a particular PCH Subchannel, i.e., a particular slot within the point-to-point messaging channel.

As an example, slot 24 (116) may be the monitored PCH Subchannel for a particular group of mobile units within a cell (assuming for a given case slot 24 is part of the point-to-point messaging channel). The PCH Subchannel may contain any of a plurality of point-to-point communications encoded in 324 bits, which make up the PCH Subchannel.

Figure 5:
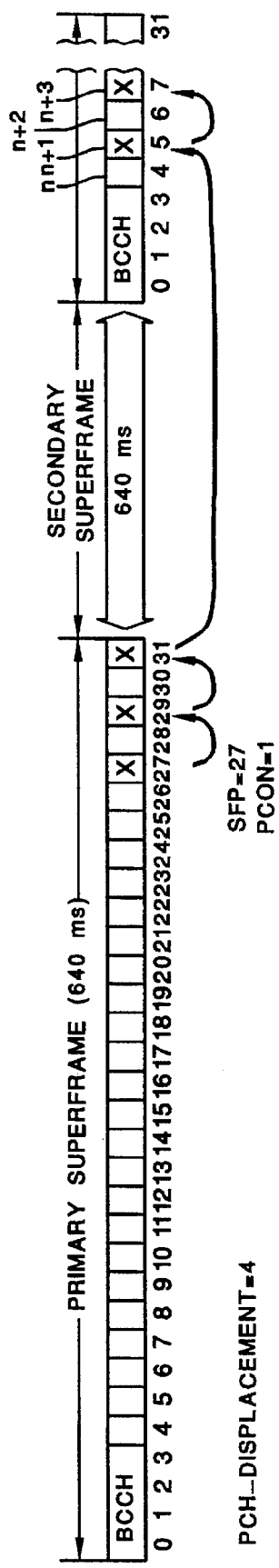
FIG. 5 is a block diagram illustrating an example of PCH Continuation in the digital control channel in accordance with the prior art.

Referring next to FIG. 5, a block diagram is shown of an example of PCH Continuation in a digital control channel of the prior art. In the example shown, PCH Continuation activation occurs on a full-rate digital control channel for a mobile station having a PCH Subchannel corresponding to Superframe Phase (SFP)=27, (i.e., slot 27). In the event the mobile station determines that there is no message addressed to its MSID in its PCH Subchannel, (i.e., slot 27), a PCON bit (i.e., page continuation bit) equals 1 and the base station has set a variable referred to as PCH_DISPLACEMENT to 4, the mobile station proceeds to read every other point-to-point messaging slot starting with the point-to-point messaging slot corresponding to SFP=29 (i.e., slot 29) in the first primary Superframe. If slot 29 is read without receiving a message addressed to the mobile station, the mobile station continues to read every other point-to-point messaging slot with SFP=31, i.e., slot 31. If slots 29 and 31 are read without receiving a message addressed to the mobile station, the mobile station continues to read point-to-point messaging slots corresponding to SFP=n+1 and n+3, i.e., the second and fourth point-to-point messaging slots in the second primary Superframe. In the event these slots are read without receiving a message addressed to its MSID, at the point where an additional number of slots equal to the set PCH_DISPLACEMENT have been read, the mobile station sleeps until the next occurrence of its assigned PCH Subchannel.

Unfortunately, in accordance with the prior art system illustrated, in order to read all of the slots in which a page for the mobile station might appear, the mobile station either remains active during the entire secondary Superframe and the broadcast control channel of the second primary Superframe, or deactivates its receive channel during the secondary Superframe and broadcast control channel, keeping its processor awake. This amounts to more than 640 mS of additional actuation time during which the mobile station's processor, and possibly its receive channel, must remain active, i.e., turned on. Furthermore, and perhaps more importantly, this also represents a significant delay in reading the slots in which a page message might appear, and a significant inefficiency in the processing of page messages.

Figure 6:
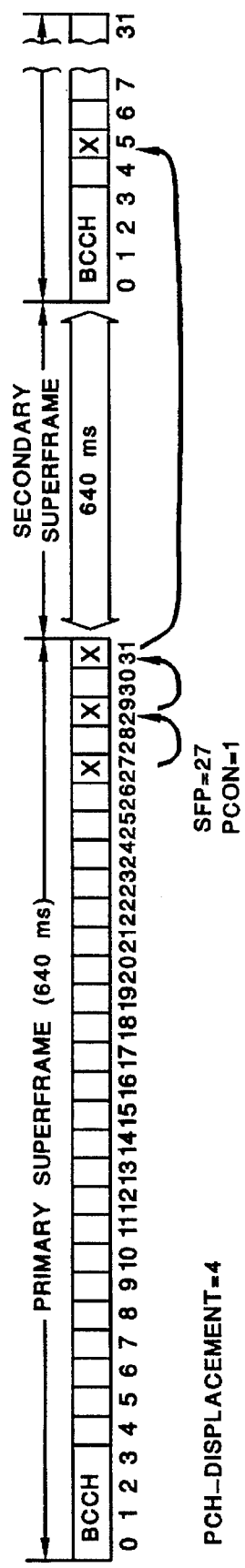
FIG. 6 is a block diagram illustrating an example of point-to-point messaging channel message continuation in the digital control channel of FIG. 5 in accordance with the prior art.

Referring next to FIG. 6, a block diagram is shown of an example of point-to-point messaging channel message continuation in a digital control channel in accordance with the prior art. Point-to-point messaging channel message continuation activation is shown on a full-rate digital control channel for a mobile station having a PCH Subchannel corresponding to SFP=27, i.e., slot 27. In the example shown, when the mobile station determines that there is no message addressed to its MSID in its assigned PCH Subchannel, and when the PCON bit is set to 1 and the base station has set PCH_DISPLACEMENT to 4, the mobile station proceeds to read every other point-to-point messaging channel slot starting with the slot corresponding to SFP=29, i.e., slot 29. In the present example, the radio unit receives, in slot 29, the first slot of a three point-to-point messaging slot page message addressed to its MSID. The mobile station next reads the point-to-point messaging slots corresponding to SFP=31 (i.e., slot 31) and SFP=n+1 (i.e., slot 5 in the next primary Superframe), which contains the remainder of the page message.

Note that in accordance with another example, the mobile station determines that there is a message addressed to its MSID in its assigned PCH Subchannel, and the base station has set PCH_DISPLACEMENT to 4. In this other example, the radio unit receives, in slot 27, the first slot of a four point-to-point messaging slot page message addressed to its MSID. The mobile station proceeds to read every other point-to-point messaging channel slot starting with the slot corresponding to SFP=29 and ending with the slot corresponding to SFP=n+1, as described in the preceding example. In accordance with this other example, the PCON bit is irrelevant.

Point-to-point messaging channel message continuation may also be used when a non-page message requiring more than one point-to-point messaging slot (i.e., a multi-slot non-page message) is sent. In this case, the PCON bit is not a factor, i.e., is irrelevant, and the number of additional slots read will be a function of the type of multi-slot point-to-point message being sent, as opposed to a function of PCH_DISPLACEMENT. Advantageously, the present embodiment thus effectively increases the bandwidth available for non-page messages, essentially without sacrificing the bandwidth available for page messages or hard pages (because, in accordance with, e.g., IS-136, multiple pages can be transmitted in a single slot using hard pages instead of page messages, which generally only carry a single page per slot).

As an example, if there are 25 point-to-point messaging slots in a digital control channel, and all 25 are PCH Subchannel slots, when 25 mobile stations are to be paged, all 25 point-to-point messaging slots may be used for transmitting page messages, leaving no slots for non-page messages. If, however, four of the 25 slots are designated as Non-PCH Subchannel slots, in accordance with an example of the present embodiment, then the 25 mobile stations are paged in the 21 available PCH Subchannel slots—with some of the PCH Subchannel slots containing hard pages for paging up to three mobile stations in a single slot. In this way, the four Non-PCH Subchannel slots are left for carrying non-page messages (or for PCH Continuation or point-to-point messaging channel message continuation, as described herein below).

Unfortunately, in accordance with the prior art system illustrated, in order to read all of the slots of the continued message, the mobile station may be required to maintain its receive channel in an active state and will be required to maintain its processor in an active state, not only during the slots to be read, but also during the entire secondary Superframe and the broadcast control channel of the second primary Superframe. This amounts to more than 640 mS of additional activation time during which the mobile station's processor and possibly receive channel, must remain active and, in addition, more than 640 ms of delay in receiving the continued message.

Thus, as can be seen in FIGS. 5 and 6, significant additional activation time for the mobile station's processor, and possibly receive channel, and a significant delay in receiving point-to-point messages results when PCH Continuation or point-to-point messaging channel message continuation activation occurs on a full-rate digital control channel. Such increased activation and delay, however, tends to have a greater impact on those mobile stations that happen to be assigned to a PCH Subchannel that is at or near the end of the primary Superframe. Those mobile stations assigned to a PCH Subchannel earlier in the primary Superframe, e.g., corresponding to, e.g., SFP=11 (i.e., slot 11) generally will not be required to maintain their receive channels and/or processors in an active state during the secondary Superframe, because there will generally be a sufficient number of PCH Subchannels available following the assigned PCH Subchannel to fulfill the needs of PCH Continuation (FIG. 5) or point-to-point messaging channel message continuation (FIG. 6) activation.

Problematically, mobile stations are not randomly assigned to their PCH Subchannel, but rather the PCH Subchannel is assigned based on a hash involving the mobile station identification number (MIN), and the available number of PCH Subchannels in the point-to-point messaging channel. Therefore, because the mobile station identification number and the number of slots in the point-to-point messaging channel of a particular base station are not likely to change very often, the mobile stations hashed to PCH Subchannels late (i.e., near the end, or to the right as oriented in FIGS. 5 and 6) in the primary Superframe are, over time, likely to be required to maintain their receive channels and/or processors in an active state for longer periods of time than those mobile stations having been assigned a PCH Subchannel earlier in the primary Superframe and are likely to experience greater delays in receiving pages and point-to-point messages. As a result, the mobile stations with PCH Subchannels late in the primary Superframe will tend to experience a higher power usage, and therefore a reduced battery life (due to the increased activation of their receive channels), and slower performance as compared with those mobile stations having a PCH Subchannel earlier in the primary Superframe. As a result, some subscribers to the cellular telephone system will, by virtue of their assigned mobile station identification numbers, receive inferior power consumption/battery life characteristics, and performance characteristics from their mobile stations.

The present embodiment provides for a Non-PCH Subchannel slot information element in the broadcast control channel of each Superframe. The Non-PCH Subchannel slot information element uses two bits to specify the number of Non-PCH Subchannel slots within the point-to-point messaging channel. By way of example, in a full rate digital control channel, if the Non-PCH Subchannel slot information element is set to 00, all point-to-point messaging slots are eligible to be allocated as PCH Subchannels. If the Non-PCH Subchannel slot information element is set to 01, the last two point-to-point messaging slots cannot be allocated as PCH Subchannels, if the Non-PCH Subchannel slot information element is set to 10, the last four cannot be allocated as PCH Subchannels, and if the Non-PCH Subchannel slot information element is set to 11, the last six cannot be allocated as PCH Subchannels. In a half-rate digital control channel, the above Non-PCH Subchannel slot information element setting signify a reservation of zero slots, the last slot, the last two slots and the last three slots in the point-to-point messaging channel, respectively.

Once slots are reserved through the Non-PCH Subchannel slot information element, they cannot be allocated as PCH Subchannels, i.e., they cannot be hashed to by mobile stations and by the base station when determining the appropriate PCH Subchannel to monitor for pages, or in which to transmit a page for a particular mobile station, respectively. They can, however, be used as additional slots for point-to-point messaging channel message continuation or PCH Continuation or for other non-page message traffic, such as access response and short message service (SMS) messages. Thus, when paging traffic increases within the point-to-point messaging channel, e.g., nearing 100% of UPR maximum paging capacity, or more, the number of slots designated in the Non-PCH Subchannel slot information element are, unlike in prior art systems, still available for the transmission of non-page messages. For example, as illustrated below in FIGS. 7 and 8, these Non-PCH Subchannel slots are available for point-to-point messaging channel message continuation and PCH Continuation, as well as for other non-page message traffic.

Figure 7:
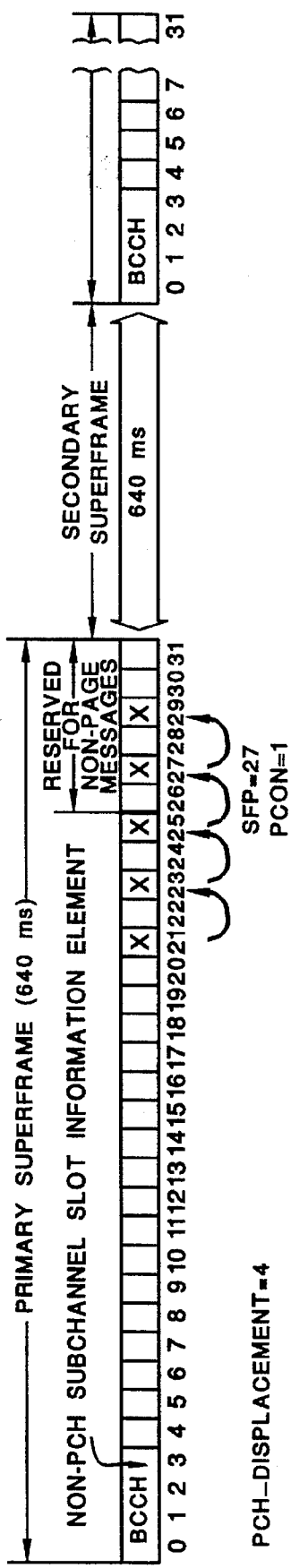
FIG. 7 is a block diagram illustrating an example of PCH Continuation in the digital control channel of FIG. 5 in accordance with an embodiment of the present invention.

Referring next to FIG. 7, a block diagram is shown illustrating an example of PCH Continuation in a digital control channel wherein an embodiment of the present invention is utilized to minimize the amount of activation of a mobile station's receive channel needed. PCH Continuation activation is illustrated as occurring on a full-rate digital control channel for a mobile station having a PCH Subchannel corresponding to SFP=21 (i.e., slot 21). In the event the mobile station determines that there is no message addressed to its mobile station identification number in its PCH Subchannel (i.e., slot 27), when the PCON bit equals 1 and the base station has set PCH_DISPLACEMENT to 4, the mobile station proceeds to read point-to-point messaging slots corresponding to SFP=23, 25, 27 and 29 (i.e., slots 23, 25, 27 and 29—a number of slots equal to PCH_DISPLACEMENT) in the first primary Superframe. Note that in the illustrated example, slots 26 through 31 of the point-to-point messaging channel are reserved for non-page messages, and therefore are not hashed to by mobile stations when determining their PCH Subchannel. (Note that the phrase "reserved for non-page messages" does not mean that such slots cannot be used for page messages, but merely that such slots are not hashed to by any mobile station when determining PCH Subchannel assignments. Such slots in accordance with the present embodiment, therefore, can only be read in response to PCH Continuation, point-to-point messaging channel message continuation, or when scanning for non-page point-to-point messages.) As a result, when the mobile station looks beyond its PCH Subchannel (as occurs in PCH Continuation and point-to-point messaging channel message continuation, or when the mobile station is searching for non-page point-to-point messages) there are, in this example, six Non-PCH Subchannel slots available after the last assigned PCH Subchannel for PCH Continuation, point-to-point messaging channel message continuation Message Continuation or non-page point-to-point messages. One result of having these Non-PCH Subchannel slots is that mobile stations with PCH subchannels late in the primary Superframe's point-to-point messaging channel are much less likely to have to maintain their processors and receive channels and/or processors in an active state through the secondary Superframe and into the next primary Superframe in order to receive PCH displaced pages or continued point-to-point messaging channel messages. A further result of having these Non-PCH subchannel slots is that these mobile stations with PCH subchannels late in the primary Superframe's point-to-point messaging channel are much less likely to experience delays caused by these PCH Continuation, point-to-point messaging channel message continuation or other multi-slot point-to-point messages that require slots in a subsequent Superframe. Another result is that there are always a few slots available for other non-page messages, such as access response messages (e.g., registration acceptance) or SMS messages, even in environments where pages greatly exceed UPR maximum paging capacity. Thus, the increased power consumption and decreased battery life, delays in message reception and reduced non-page message throughput, heretofore experienced by these mobile stations, is significantly reduced or eliminated by the present embodiment.

Figure 8:
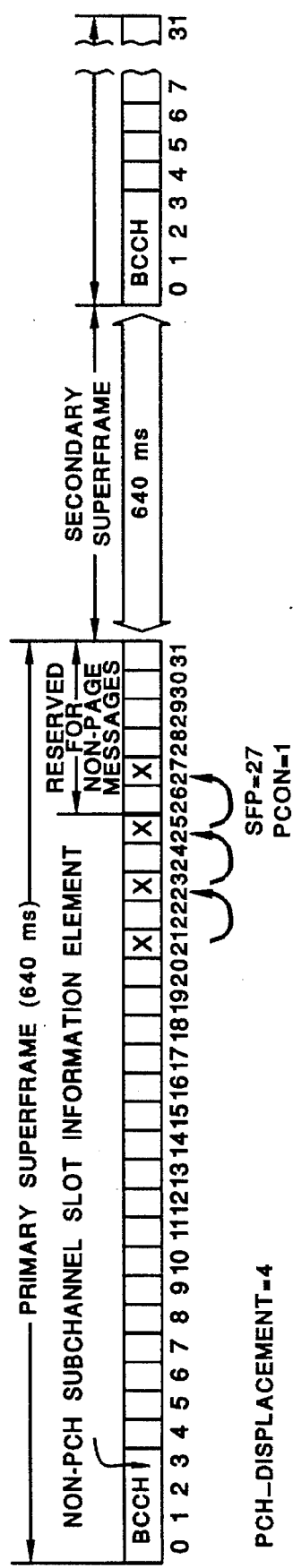
FIG. 8 is a block diagram illustrating an example of point-to-point message continuation in the digital control channel of FIG. 5 in accordance with another embodiment of the present invention.

Referring next to FIG. 8, a block diagram is shown illustrating an example of point-to-point messaging channel message continuation in the digital control channel in accordance with another embodiment of the invention. Point-to-point messaging channel message continuation activation on a full-rate digital control channel for a mobile station having a PCH Subchannel corresponding to SFP=21, (i.e., slot 21) is shown. When the mobile station determines that there is no message addressed to its MSID in the assigned PCH Subchannel, and when the PCON bit is set to 1 and the base station has set PCH_DISPLACEMENT to 4, the mobile station proceeds to read the point-to-point messaging slot corresponding to SFP=23, (i.e., slot 23) and receives in such slot the first slot of a three point-to-point messaging slot page message addressed to its MSID. The mobile station next reads the point-to-point messaging slots corresponding to SFP=31 (i.e., slot 31), SFP=25 (i.e., slot 25) and SFP=27 (i.e., slot 27) in the primary Superframe.

As with the example described above in FIG. 7, it can be seen that in the present embodiment, mobile stations having assigned (i.e., hashed) to them a PCH Subchannel late in the group of subchannels within the point-to-point messaging channel are able to receive a three slot point-to-point messaging channel message that has been continued from its assigned PCH Subchannel. Unlike in heretofore known cellular telephone systems, as described above in FIG. 6, the present embodiment eliminates or substantially reduces the need for these mobile stations having assigned PCH Subchannels late in the point-to-point messaging channel to maintain their receive channels and/or processors in an active state during the secondary Superframe and into the next primary Superframe (as illustrated in FIG. 6); and substantially improves the performance of these mobile station by eliminating delays in the reception of non-page messages due to their spanning more than one Superframe.

While the invention herein disclosed has been described by means of specific embodiments and applications thereof, numerous modifications and variations could be made thereto by those skilled in the art without departing from the scope of the invention set forth in the claims.

What is claim is:

1. In a communications system, a method of ensuring bandwidth availability for non-page messages, the method comprising:

assembling a superframe within a base station, the superframe comprising a plurality of slots, the assembling including:

defining a broadcast control channel comprising a first portion of the plurality of slots, the broadcast control channel comprising a Non-PCH Subchannel slot information element, defining a point-to-point control channel comprising a second portion of the plurality of slots, the point-to-point control channel slots comprising Non-PCH Subchannel slots, wherein the Non-PCH Subchannel slot information element specifying a number of the Non-PCH Subchannel slots to be reserved within the point-to-point control channel, and reserving said specified Non-PCH Subchannel slots; and transmitting the superframe from the base station to a radio unit.

2. The method of claim 1 further comprising:

receiving said superframe from said base station into said radio unit;

disassembling said superframe in said radio unit, the disassembling including:

reading said Non-PCH Subchannel slot information element from said first portion of said plurality of said slots, selecting a page slot within said second portion of said plurality of slots for said radio unit, said selecting being in response to said Non-PCH Subchannel slot information element.

3. The method of claim 2 further comprising:

activating at least a portion of a receive channel within said radio unit during said page slot within said superframe and within a subsequent superframe following said superframe; and deactivating the at least a portion of the receive channel during remaining slots within said superframe and within the subsequent superframe following said superframe.

4. The method of claim 3 further comprising:

determining within said superframe whether a page message intended for said radio unit is included within said page slot; and determining within said subsequent superframe whether the page message intended for said radio unit is included within said page slot.

5. The method of claim 4 further comprising:

determining within said superframe whether a page continuation indication is made within said page slot by said base station; and determining within said subsequent superframe whether the page continuation indication is made within said page slot by said base station.

6. The method of claim 5 further comprising:

activating said at least a portion of said receive channel within said radio unit during a subsequent slot following said page slot within said superframe in the event said page continuation indication is made within said page slot within said superframe by said base station, the subsequent slot being one of said number of Non-PCH Subchannel slots within said point-to-point control channel; and activating said at least a portion of said receive channel within said radio unit during the subsequent slot following said page slot within said subsequent superframe in the event said page continuation indication is made within said page slot within said subsequent superframe by said base station, the subsequent slot being one of said number of Non-PCH Subchannel slots within said point-to-point control channel.

7. The method of claim 2 further comprising:

activating a processor within said radio unit during said page slot within said superframe and during said page slot within a subsequent superframe following said superframe; and deactivating the processor during remaining slots within said superframe and during remaining slots within said subsequent superframe following said superframe.

8. The method of claim 7 further comprising:

determining within said superframe whether a page message intended for said radio unit is included within said page slot; and determining within said subsequent superframe following said superframe whether the page message intended for said radio unit is included within said page slot.

9. The method of claim 8 further comprising:

determining within said superframe whether a page continuation indication is made within said page slot by said base station; and determining within said subsequent superframe following said superframe whether the page continuation indication is made within said page slot by said base station.

10. The method of claim 9 further comprising:

activating said processor within said radio unit during a subsequent slot following said page slot within said superframe in the event said page continuation indication is made within said page slot within said superframe by said base station, the subsequent slot being one of said number of Non-PCH Subchannel slots within said point-to-point control channel; and activating said processor within said radio unit during the subsequent slot following said page slot within said subsequent superframe following said superframe in the event said page continuation indication is made within said page slot within said subsequent superframe by said base station, the subsequent slot being one of said number of Non-PCH Subchannel slots within said point-to-point control channel.

11. The method of claim 2 further comprising:

receiving a first portion of a multi-slot page message within said page slot having been selected within said second portion;

receiving a second portion of the multi-slot page message within a subsequent slot within said number of Non-PCH Subchannel slots.

12. The method of claim 2 further comprising:

receiving a first portion of a multi-slot non-page message within a first slot that is within said second portion;

receiving a second portion of the multi-slot non-page message within a second slot that is within said number of Non-PCH Subchannel slots.

13. The method of claim 2 further comprising:

receiving a slot of a non-page message within a slot within said number of Non-PCH Subchannel slots.

14. The method of claim 13 further comprising:

receiving a subsequent slot of said non-page message within a subsequent slot within said number of Non-PCH Subchannel slots.

* * * * *